(12) United States Patent
Yang et al.

(10) Patent No.: US 10,826,872 B2
(45) Date of Patent: *Nov. 3, 2020

(54) SECURITY POLICY FOR BROWSER EXTENSIONS

(71) Applicant: Shape Security, Inc., Mountain View, CA (US)

(72) Inventors: Siying Yang, Cupertino, CA (US); Sergey Shekyan, Redwood City, CA (US)

(73) Assignee: SHAPE SECURITY, INC., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/236,519

(22) Filed: Dec. 30, 2018

(65) Prior Publication Data

US 2019/0215304 A1  Jul. 11, 2019

Related U.S. Application Data

(63) Continuation of application No. 14/942,769, filed on Nov. 16, 2015, now Pat. No. 10,212,130.

(51) Int. Cl.
*H04L 29/06* (2006.01)
*G06F 21/62* (2013.01)
*G06F 21/44* (2013.01)

(52) U.S. Cl.
CPC .......... *H04L 63/0236* (2013.01); *G06F 21/44* (2013.01); *G06F 21/629* (2013.01);
(Continued)

(58) Field of Classification Search
CPC ... H04L 63/0236; H04L 63/20; H04L 63/101; G06F 21/44; G06F 21/629; G06F 21/6218
See application file for complete search history.

(56) References Cited

U.S. PATENT DOCUMENTS 5,509,076 A  4/1996  Sprunk
6,654,707 B2  11/2003  Wynn
(Continued)

FOREIGN PATENT DOCUMENTS

CN  101471818  5/2011
WO  WO2008/095018  8/2008
(Continued)

OTHER PUBLICATIONS

NOA, mailed on Feb. 7, 2019, re: Siying Yang, U.S. Appl. No. 16/190,015, filed Nov. 13, 2018.
(Continued)

*Primary Examiner* — John B King
(74) *Attorney, Agent, or Firm* — Troutman Pepper Hamilton Sanders LLP (Rochester)

(57) ABSTRACT

Techniques are provided for a security policy for browser extensions. A first pattern is determined that is present in requests from client computing devices when a first browser extension is operating on the client computing devices. The first pattern is identified in a first request from a first client computing device to a first web server system. It is determined, based on identifying the first pattern in the first request, that the first browser extension is associated with the first request. It is determined that the first browser extension associated with the first request is whitelisted with respect to the first web server system based on a security policy. In response to determining that the first browser extension is whitelisted with respect to the first web server system, a first automated response is performed that causes the first web server system to process the first request.

28 Claims, 6 Drawing Sheets

(52) U.S. Cl.
CPC ........ *G06F 21/6218* (2013.01); *H04L 63/101* (2013.01); *H04L 63/20* (2013.01)

(56) References Cited

U.S. PATENT DOCUMENTS

| | | | |
|---|---|---|---|
| 7,058,699 | B1 | 6/2006 | Chiou |
| 7,107,347 | B1 | 9/2006 | Cohen |
| 7,398,553 | B1 | 7/2008 | Li |
| 7,424,720 | B2 | 9/2008 | Chagoly |
| 7,464,326 | B2 | 12/2008 | Kawai |
| 7,797,421 | B1* | 9/2010 | Scofield .............. H04L 63/1416 709/224 |
| 7,849,502 | B1* | 12/2010 | Bloch ............... H04L 29/12066 726/11 |
| 7,870,610 | B1 | 1/2011 | Mitchell |
| 7,895,653 | B2 | 2/2011 | Calo |
| 8,170,020 | B2 | 5/2012 | Oliver |
| 8,195,953 | B1 | 6/2012 | Yue |
| 8,453,126 | B1 | 5/2013 | Ganelin |
| 8,555,388 | B1 | 10/2013 | Wang |
| 8,561,193 | B1 | 10/2013 | Srivastava |
| 8,578,499 | B1 | 11/2013 | Zhu |
| 8,589,405 | B1 | 11/2013 | Estan |
| 8,615,804 | B2 | 12/2013 | Mui |
| 8,650,648 | B2* | 2/2014 | Howard ................ G06F 21/567 726/24 |
| 8,677,481 | B1 | 3/2014 | Lee |
| 8,689,330 | B2 | 4/2014 | Sinn |
| 8,713,684 | B2 | 4/2014 | Bettini |
| 8,726,394 | B2 | 5/2014 | Maor |
| 8,739,284 | B1* | 5/2014 | Gardner ................. G06F 21/55 726/24 |
| 8,752,208 | B2 | 6/2014 | Shulman |
| 8,762,962 | B2 | 6/2014 | Ben-Artzi |
| 8,843,820 | B1* | 9/2014 | Kay ........................ G06F 21/51 715/234 |
| 8,849,985 | B1 | 9/2014 | Colton |
| 8,997,226 | B1 | 3/2015 | Call |
| 9,043,924 | B2 | 5/2015 | Maor |
| 9,158,893 | B2 | 10/2015 | Call |
| 9,225,729 | B1 | 12/2015 | Moen |
| 9,225,737 | B2 | 12/2015 | Call |
| 9,258,328 | B2* | 2/2016 | Ibatullin .............. G06F 21/554 |
| 9,456,050 | B1 | 9/2016 | Lepeska |
| 9,537,888 | B1 | 1/2017 | McClintock |
| 9,609,006 | B2 | 3/2017 | Call |
| 9,628,498 | B1 | 4/2017 | Aziz |
| 9,635,041 | B1* | 4/2017 | Warman ................. H04L 41/50 |
| 9,639,699 | B1 | 5/2017 | Kurupati |
| 9,646,140 | B2 | 5/2017 | Horadan |
| 9,680,850 | B2 | 6/2017 | Rapaport |
| 9,686,300 | B1 | 6/2017 | Kurupati |
| 9,705,902 | B1 | 7/2017 | Call |
| 9,906,544 | B1 | 2/2018 | Kurupati |
| 10,165,004 | B1 | 12/2018 | Mehta |
| 2002/0194219 | A1 | 12/2002 | Bradley |
| 2002/0199116 | A1 | 12/2002 | Hoene |
| 2003/0123431 | A1* | 7/2003 | Geck .................... H04M 1/2478 370/352 |
| 2004/0088651 | A1 | 5/2004 | McKnight |
| 2005/0060535 | A1* | 3/2005 | Bartas .................. H04L 63/02 713/154 |
| 2005/0108554 | A1 | 5/2005 | Rubin |
| 2005/0172338 | A1 | 8/2005 | Sandu |
| 2005/0198099 | A1 | 9/2005 | Motsinger |
| 2005/0216770 | A1 | 9/2005 | Rowett |
| 2005/0240999 | A1 | 10/2005 | Rubin |
| 2005/0251536 | A1 | 11/2005 | Harik |
| 2005/0278626 | A1 | 12/2005 | Malik |
| 2006/0053295 | A1 | 3/2006 | Madhusudan |
| 2006/0101047 | A1 | 5/2006 | Rice |
| 2006/0174323 | A1 | 8/2006 | Brown |
| 2006/0195588 | A1 | 8/2006 | Pennington |
| 2006/0230288 | A1 | 10/2006 | Fox |
| 2006/0288418 | A1 | 12/2006 | Yang |
| 2007/0011295 | A1 | 1/2007 | Hansen |
| 2007/0064617 | A1 | 3/2007 | Reves |
| 2007/0088955 | A1 | 4/2007 | Lee |
| 2007/0128899 | A1* | 6/2007 | Mayer ................... G06F 9/4406 439/152 |
| 2007/0234070 | A1 | 10/2007 | Horning |
| 2008/0208785 | A1 | 8/2008 | Trefler |
| 2008/0320567 | A1 | 12/2008 | Shulman |
| 2009/0070459 | A1 | 3/2009 | Cho |
| 2009/0099988 | A1 | 4/2009 | Stokes |
| 2009/0106296 | A1* | 4/2009 | Sickmiller ............ G06F 16/955 |
| 2009/0199297 | A1 | 8/2009 | Jarrett |
| 2009/0241174 | A1 | 9/2009 | Rajan |
| 2009/0292791 | A1 | 11/2009 | Livshits |
| 2010/0088404 | A1 | 4/2010 | Mani |
| 2010/0106611 | A1 | 4/2010 | Paulsen |
| 2010/0142382 | A1 | 6/2010 | Jungck et al. |
| 2010/0186089 | A1 | 7/2010 | Fu |
| 2010/0218253 | A1 | 8/2010 | Andrew |
| 2010/0235637 | A1 | 9/2010 | Lu |
| 2010/0235910 | A1 | 9/2010 | Ku |
| 2010/0287132 | A1 | 11/2010 | Hauser |
| 2011/0035733 | A1 | 2/2011 | Horning |
| 2011/0154308 | A1 | 6/2011 | Lobo |
| 2011/0225234 | A1 | 9/2011 | Amit |
| 2011/0231305 | A1 | 9/2011 | Winters |
| 2011/0320816 | A1 | 12/2011 | Yao |
| 2012/0036576 | A1 | 2/2012 | Iyer |
| 2012/0090030 | A1 | 4/2012 | Rapaport |
| 2012/0198528 | A1 | 8/2012 | Baumhof |
| 2012/0254727 | A1 | 10/2012 | Jain |
| 2012/0255006 | A1 | 10/2012 | Aly et al. |
| 2012/0324236 | A1 | 12/2012 | Srivastava |
| 2013/0047255 | A1* | 2/2013 | Dalcher ................. H04L 63/20 726/23 |
| 2013/0086679 | A1 | 4/2013 | Beiter |
| 2013/0219492 | A1 | 8/2013 | Call |
| 2013/0239195 | A1 | 9/2013 | Turgeman |
| 2013/0247030 | A1* | 9/2013 | Kay ........................ H04L 67/34 717/178 |
| 2013/0263264 | A1 | 10/2013 | Klein |
| 2013/0273882 | A1 | 10/2013 | Walsh |
| 2014/0040051 | A1 | 2/2014 | Ovick |
| 2014/0096194 | A1 | 4/2014 | Bhogavilli |
| 2014/0101236 | A1 | 4/2014 | Dietrich |
| 2014/0208198 | A1 | 7/2014 | Ayoub |
| 2014/0282014 | A1* | 9/2014 | Lee ........................ G06F 3/048 715/733 |
| 2014/0298469 | A1 | 10/2014 | Marion |
| 2014/0304816 | A1 | 10/2014 | Klein |
| 2014/0310392 | A1 | 10/2014 | Ho |
| 2014/0365794 | A1* | 12/2014 | Decker .................. G06F 1/3246 713/320 |
| 2015/0058992 | A1 | 2/2015 | El-Moussa |
| 2015/0067031 | A1 | 3/2015 | Acharya |
| 2015/0067866 | A1 | 3/2015 | Ibatullin |
| 2015/0112892 | A1 | 4/2015 | Kaminsky |
| 2015/0262183 | A1 | 9/2015 | Gervais |
| 2015/0278619 | A1 | 10/2015 | Horning |
| 2015/0281263 | A1 | 10/2015 | McLaughlin |
| 2015/0358338 | A1 | 12/2015 | Zeitlin |
| 2015/0379266 | A1 | 12/2015 | McLaughlin |
| 2016/0005029 | A1 | 1/2016 | Ivey |
| 2016/0072829 | A1 | 3/2016 | Call |
| 2016/0119344 | A1 | 4/2016 | Dos Santos |
| 2016/0191554 | A1 | 6/2016 | Kaminsky |
| 2016/0342793 | A1 | 11/2016 | Hidayat |
| 2016/0344769 | A1 | 11/2016 | Li |
| 2016/0378989 | A1 | 12/2016 | Park |
| 2017/0012960 | A1 | 1/2017 | Idika |
| 2017/0013012 | A1 | 1/2017 | Hansen |
| 2017/0048260 | A1* | 2/2017 | Peddemors ......... H04L 63/1416 |
| 2017/0201540 | A1 | 7/2017 | Call |
| 2017/0235954 | A1 | 8/2017 | Kurupati |
| 2017/0237766 | A1 | 8/2017 | Mattson |
| 2017/0257383 | A1 | 9/2017 | Ficarra |
| 2017/0257385 | A1 | 9/2017 | Overson |
| 2017/0293748 | A1 | 10/2017 | Kurupati |
| 2018/0205747 | A1 | 7/2018 | Ficarra |

(56) References Cited

U.S. PATENT DOCUMENTS

| | | |
|---|---|---|
| 2018/0255154 A1 | 9/2018 | Li |
| 2019/0081977 A1 | 3/2019 | Yang |
| 2019/0141064 A1 | 5/2019 | Call |
| 2019/0182251 A1 | 6/2019 | Jampani |
| 2019/0215304 A1 | 7/2019 | Yang |
| 2019/0245858 A1 | 8/2019 | Idika |
| 2019/0268359 A1 | 8/2019 | Zhang |
| 2019/0327265 A1 | 10/2019 | Zhao |
| 2019/0364019 A1 | 11/2019 | Yang |
| 2019/0373012 A1 | 12/2019 | Mattson |
| 2019/0394228 A1 | 12/2019 | Yang |

FOREIGN PATENT DOCUMENTS

| | | |
|---|---|---|
| WO | WO2008/095031 | 8/2008 |
| WO | WO2008/130946 | 10/2008 |
| WO | WO 2017/007705 | 1/2017 |
| WO | WO 2017/007936 | 1/2017 |
| WO | WO 2017/074622 | 5/2017 |

OTHER PUBLICATIONS

CTNF, mailed on Mar. 9, 2017, re: Siying Yang, U.S. Appl. No. 14/925,547, filed Oct. 28, 2015.
NOA, mailed on Apr. 23, 2015, re: Justin Call, U.S. Appl. No. 13/527,025, filed Jun. 19, 2012.
CTFR, mailed on Feb. 10, 2015, re: Justin Call, U.S. Appl. No. 13/527,025, filed Jun. 19, 2012.
CTNF, mailed on Nov. 2, 2012, re: Justin Call, U.S. Appl. No. 13/527,025, filed Jun. 19, 2012.
CTFR, mailed on Apr. 23, 2013, re: Justin Call, U.S. Appl. No. 13/527,025, filed Jun. 19, 2012.
CTNF. mailed on Aug. 4, 2014, re: Justin Call, U.S. Appl. No. 13/527,025, filed Jun. 19, 2012.
NOA, mailed on Jun. 1, 2015, re: Justin Call, U.S. Appl. No. 13/527,025, filed Jun. 19, 2012.
CTNF, mailed on Feb. 26, 2015, re: Justin Call, U.S. Appl. No. 14/055,576, filed Oct. 16, 2013.
NOA, mailed on Aug. 21, 2015, re: Justin Call, U.S. Appl. No. 14/055,576, filed Oct. 16, 2013.
CTNF, mailed on May 20, 2015, re: Justin Call, U.S. Appl. No. 14/110,659, filed Oct. 8, 2013.
NOA, mailed on Aug. 19, 2015, re: Daniel Moen, U.S. Appl. No. 14/160,107, filed Jan. 21, 2014.
CTNF, mailed on Jun. 27, 2014, re: Justin Call, U.S. Appl. No. 14/255,248, filed Apr. 17, 2014.
NOA, mailed on Nov. 19, 2014, re: Justin Call, U.S. Appl. No. 14/255,248, filed Apr. 17, 2014.
NOA mailed on Dec. 24, 2014, re: Justin Call, U.S. Appl. No. 14/255,248, filed Apr. 17, 2014.
CTNF, mailed on Sep. 1, 2015, re: Ariya Hidayt, U.S. Appl. No. 14/293,895, filed Jun. 2, 2014.
NOA mailed on Mar. 30, 2016, re: Ariya Hidayat, U.S. Appl. No. 14/293,895, filed Jun. 2, 2014.
NOA, mailed on Jul. 21, 2016, re: Siying Yang, U.S. Appl. No. 14/541,062, filed Nov. 13, 2014.
CTNF, mailed on Feb. 23, 2016, re: Siying Yang, U.S. Appl. No. 14/541,062, filed Nov. 13, 2014.
CTNF, mailed on May 8, 2015, re: Timothy Peacock, U.S. App. No. 14/570,632, filed Dec. 15, 2014.
NOA, mailed on Dec. 18, 2015, re: Timothy Peacock, U.S. Appl. No. 14/570,632, filed Dec. 15, 2014.
CTNF, mailed on on Mar. 17, 2016, re: Justin Call, U.S. Appl. No. 14/672,879, filed Mar. 30, 2015.
CTNF, mailed on Nov. 10, 2016, re: Nwokedi Idika, U.S. Appl. No. 14/728,621, filed Jun. 2, 2015.
CTNF, mailed on Mar. 14, 2016, re: Justin Call, U.S. Appl. No. 14/874,717, filed Oct. 5, 2015.
NOA, mailed on Apr. 28, 2016, re: Justin Call, U.S. Appl. No. 14/874,717, filed Oct. 5, 2015.
NOA, mailed on Nov. 16, 2016, re: Justin Call, U.S. Appl. No. 14/980,409, filed Dec. 28, 2015.
CTNF, mailed on Aug. 2, 2016, re: Justin Call, U.S. Appl. No. 14/980,409, filed Dec. 28, 2015.
CTFR, mailed on Nov. 18, 2016, re: Justin D. Call, U.S. Appl. No. 14/672,879, filed Mar. 30, 2015.
CTNF, mailed on Jun. 1, 2017, re: Siying Yang, U.S. Appl. No. 14/942,769, filed Nov. 16, 2015.
CTNF, mailed on Jun. 2, 2017, re: Ariyna Hidayat, U.S. Appl. No. 15/224,978, filed Aug. 1, 2016.
CTNF, mailed on Apr. 7, 2017, re: Yao Zhao, U.S. Appl. No. 14/861,906, filed Sep. 22, 2015.
CTNF, mailed on May 25, 2017, re: Daniel G. Moen, U.S. Appl. No. 14/980,231, filed Dec. 28, 2015.
CTNF, mailed on Jul. 26, 2017, re: Bei Zhang, U.S. Appl. No. 14/859,084, filed Sep. 18, 2015.
CTNF, mailed on Jun. 21, 2017, re: Zhiwei Li, U.S. Appl. No. 14/718,736, filed May 21, 2015.
CTNF, mailed on Aug. 30, 2017, re: Justin D. Call, U.S. Appl. No. 15/470,715, filed Mar. 27, 2017.
CTFR, mailed on Sep. 5, 2017, re: Siying Yang, U.S. Appl. No. 14/925,547, filed Oct. 28, 2015.
CTNF, mailed on Oct. 19, 2017, re: Jarrod S. Overson, U.S. Appl. No. 15/059,080, filed Mar. 2, 2016.
NOA, mailed on Oct. 25, 2017, re: Michael J. Ficarra, U.S. Appl. No. 15/060,322, filed Mar. 3, 2016.
CTNF, mailed on Nov. 13, 2017, re: Nwokedi Idika, U.S. Appl. No. 14/728,596, filed Jun. 2, 2015.
CTNF, mailed on Dec. 13, 2017, re: Justin D. Call, U.S. Appl. No. 15/645,787, filed Jul. 10, 2017.
NOA, mailed on Dec. 18, 2017, re: Yao Zhao, U.S. Appl. No. 14/861,906, filed Sep. 22, 2015.
NOA, mailed on Jan. 5, 2018, re: Yao Zhao, U.S. Appl. No. 14/861,906, filed Sep. 22, 2015.
NOA, mailed on Jan. 9, 2018, re: Justin D. Call, U.S. Appl. No. 15/470,715, filed Mar. 27, 2017.
CTFR, mailed on Jan. 25, 2018, re: Siying Yang, U.S. Appl. No. 15/942,769, filed Nov. 16, 2015.
CTNF, mailed on Feb. 7, 2017, re: Daniel G. Moen, U.S. Appl. No. 14/980,231, filed Dec. 28, 2015.
CTFR, mailed on Jan. 10, 2018, re: Bei Zhang, U.S. Appl. No. 14/859,084, filed Sep. 18, 2015.
NOA, mailed on Jan. 25, 2018, re: Zhiwei Li, U.S. Appl. No. 14/718,736, filed May 21, 2015.
CTNF, mailed on Mar. 30, 2018, re: Michael J. Ficarra, U.S. Appl. No. 15/060,380, filed Mar. 3, 2016.
CTNF, mailed on Apr. 19, 2018, re: Michael J. Ficarra, U.S. Appl. No. 15/919,034, filed Mar. 12, 2018.
CTNF, mailed on May 15, 2018, re: Marc R. Hansen, U.S. Appl. No. 15/202,755, filed Jul. 6, 2016.
CTFR, mailed on May 10, 2018, re: Nwokedi Idika, U.S. Appl. No. 14/728,596, filed Jun. 2, 2015.
CTNF, mailed on Feb. 16, 2018, re: Siying Yang, U.S. Appl. No. 15/068,468, filed Mar. 11, 1016.
NOA, mailed on May 18, 2018, re: Siying Yang, U.S. Appl. No. 14/942,769, filed Nov. 16, 2015.
CTNF, mailed on May 23, 2018, re: Bei Zhang, U.S. Appl. No. 14/859,084, filed Sep. 18, 2015.
CTFR, mailed on May 17, 2018, re: Jarrod S. Overson, U.S. Appl. No. 15/059,080, filed Mar. 2, 2016.
CTNF, mailed on Jun. 7, 2018, re: Siying Yang, U.S. Appl. No. 14/925,547, filed Oct. 28, 2015.
CTNF, mailed on Jun. 29, 2018, re: Timothy Dylan Peacock, U.S. Appl. No. 15/137,824, filed Apr. 25, 2016.
CTNF, mailed on Feb. 1, 2018, re: Nwokedi Idika, U.S. Appl. No. 15/204,710, filed Jul. 7, 2016.
NOA, mailed on Aug. 13, 208, re: Daniel G. Moen, U.S. Appl. No. 14/980,231, filed Dec. 28, 2015.
NOA, mailed on Sep. 5, 2018, re: Daniel G. Moen, U.S. Appl. No. 14/980,231, filed Dec. 28, 2015.

(56) References Cited

OTHER PUBLICATIONS

NOA, mailed on Sep. 17, 2018, re: Siying Yang, U.S. Appl. No. 14/942,769, filed Nov. 16, 2015.
NOA, mailed on Sep. 5, 2018, re: Michael J. Ficarra, U.S. Appl. No. 15/919,034, filed Mar. 12, 2018.
NOA, mailed on Jul. 5, 2018, re: Siying Yang, U.S. Appl. No. 15/068,468, filed Mar. 11, 2016.
NOA, mailed on Sep. 19, 2018, re: Nwokedi Idika, U.S. Appl. No. 15/204,710, filed Jul. 7, 2016.
CTNF, mailed on Sep. 19, 2018, re: Eli Mattson, U.S. Appl. No. 15/430,224, filed Feb. 10, 2017.
CTFR, mailed on Sep. 11, 2018, re: Michael J. Ficarra, U.S. Appl. No. 15/060,380. filed Mar. 3, 2016.
CTFR, mailed on Nov. 1, 2018, re: Marc R. Hansen, U.S. Appl. No. 15/202,755, filed Jul, 6, 2016.
CTFR, mailed on Nov. 30, 2018, re: Siying Yang, U.S. Appl. No. 14/925,547, filed Oct. 28, 2015.
NOA, mailed on Nov. 27, 2018, re: Nwokedi Idika, U.S. Appl. No. 15/204,710, filed Jul. 7, 2016.
CTNF, mailed on Oct. 5, 2018, re: Zhiwei Li, U.S. Appl. No. 15/968,573, filed May 1, 2018.
NOA, mailed on Sep. 12, 2018, re: Justin D. Call, U.S. Appl. No. 15/645,787, filed Jul. 10, 2017.
CTNF, mailed on Nov. 29, 2018, re: Jarrod S. Overson U.S. Appl. No. 15/059,080, filed Mar. 2, 2016.
NOA, mailed on Jan. 3, 2019, re: Bei Zhang, U.S. Appl. No. 14/859,084, filed Sep. 18, 2015.
CTNF, mailed on Jan. 24, 2019, re: Nwokedi Idika, U.S. Appl. No. 14/728,596, filed Jun. 2, 2015.
NOA, mailed on Feb. 6, 2019, re: Eli Mattson, U.S. Appl. No. 15/430,224, filed Feb. 10, 2017.
NOA, mailed on Mar. 25, 2019, re: Siying Yang, U.S. Appl. No. 14/925,547, filed Oct. 28, 2015.
CTFR, mailed on Apr. 15, 2019, re: Jarrod S. Overson, U.S. Appl. No. 15/059,080, filed Mar. 2, 2016.
NOA, mailed on Mar. 11, 2019, re: Zhiwei Li, U.S. Appl. No. 15/968,573, filed May 1, 2018.
CTNF, mailed on May 15, 2019, re: Michael J. Ficarra, U.S. Appl. No. 15/060,380, filed Mar. 3, 2016.
NOA, mailed on Jun. 3, 2019, re: Siying Yang, U.S. Appl. No. 16/190,015, filed Nov. 13, 2018.
CTFR, mailed on Jul. 1, 2019, re: Nwokedi Idika, U.S. Appl. No. 14//728,596, filed Jun. 2, 2015.
CTNF, mailed on Sep. 4, 2019, re: Timothy Dylan Peacock, U.S. Appl. No. 15/137,824, filed Apr. 25, 2016.
CTNF, mailed on Aug. 14, 2019, re: Nwokedi Idika, U.S. Appl. No. 16/236,520, filed Dec. 30, 2018.
CTNF, mailed on Sep. 4, 2019, re: Justin D. Call, U.S. Appl. No. 16/234,848, filed Dec. 28, 2018.
CTNF, mailed on Sep. 4, 2019, re: Bei Zhang, U.S. Appl. No. 16/413,451, filed May 15, 2019.
NOA, mailed on Oct. 3, 2019, re: Marc R. Hansen, U.S. Appl. No. 15/202,755, filed Jul. 6, 2016.
CTNF, mailed on Sep. 24, 2019, re: Ganesh Jampani, U.S. Appl. No. 16/259,890, filed Jan. 28, 2019.
NOA, mailed on Oct. 17, 2019, re: Michael J. Ficarra, U.S. Appl. No. 15/060,380, filed Mar. 3, 2016.
NOA, mailed on Dec. 3, 2019, re: Nwokedi Idika, U.S. Appl. No. 16/236,520, filed Dec. 30, 2018.
CTNF, mailed on Dec. 11, 2019, re: Siying Yang, U.S. Appl. No. 16/236,519, filed Dec. 30, 2018.
NOA, mailed on Dec. 11, 2019, re: Jarrod S. Overson, U.S. Appl. No. 15/059,080, filed Mar. 2, 2016.
U.S. Appl. No. 16/190,015, filed Mar. 14, 2019, inventor Yang.
U.S. Appl. No. 16/457,589, filed Oct. 24, 2019, inventor Li.
Detection and Analysis of Drive-by-Download Attacks and Malicious JavaScript Code, Apr. 26, 2010.
Defending Browsers against Drive-by Downloads: Mitigating Heap-spraying Code Injection Attacks, Jul. 9, 2009.
Intrusion Detection using Sequences of System calls, Aug. 18, 1998.
Recent Java exploitation trends and malware, Jul. 26, 2012.
DoDOM: Leveraging DOM Invariants for Web 2.0 Application Robustness Testing, Nov. 1, 2010.
Cujo: Efficient Detection and Prevention of Drive-by-Download Attacks, Dec. 6, 2010.
Design and Implementation of a Distributed Virtual Machine for Networked Computers, 1999.
International Search Report, dated Sep. 22, 2016, PCT/US16/40645.
International Search Report, dated Feb. 16, 2017, PCT/US16/53472.
International Search Report, dated Oct. 11, 2016, PCT/US16/41337.
International Search Report, dated Jul. 1, 2016, PCT/US16/25092.
International Search Report, dated Aug. 1, 2014, PCT/US14/24232.
International Search Report, dated Jun. 3, 2013, PCT/US13/26516.
DuPaul, Neil, "Common Malware Types: Cybersecurity 101", Veracode, Oct. 12, 2012, 9 pages, Oct. 12, 2012.
Friendly Bit, "Rendering a web page—step by step", published Jan. 11, 2010, pp. 1-2, Jan. 11, 2010.
"Custom Elements: defining new elements in HTML", Dec. 8, 2013, 15 pages, Dec. 8, 2013.

\* cited by examiner

SECURITY POLICY FOR BROWSER EXTENSIONS

CROSS-REFERENCE TO RELATED APPLICATIONS; BENEFIT CLAIM

This application claims the benefit under 35 U.S.C. § 120 as a Continuation of U.S. patent application Ser. No. 14/942,769, filed on 2015 Nov. 16, the entire contents of which are hereby incorporated by reference as if fully set forth herein.

BACKGROUND

Web sites and applications as well as client devices are vulnerable to attack by malicious third parties. In some attacks, a browser extension may be abused to impair a client device on which the browser extension is operating, e.g., by downloading malicious executable files, hijacking user accounts, sniffing a user's web transactions, etc. In other attacks, browser extensions may be exploited to harm web sites visited by such client devices, e.g., by exploiting a web site's vulnerabilities to bypass two-factor authentication, launching Denial-of-Service (DOS) attacks, illegitimately scraping web site content, etc. Existing approaches to dealing with such attacks, such as server-side web application firewalls or client-side malware detection, do not fully address the range of threats.

SUMMARY

According to various implementations, methods, apparatus, systems, and computer program products are provided for detecting browser extensions. According to a particular class of implementations, a request from a client to a server is received. The request corresponds to an interaction with a first web page hosted by the server. A pattern associated with the request is identified. It is determined that the pattern corresponds to a whitelisted browser extension with respect to the first web page. The request is passed to the server.

In some implementations, the whitelisted browser extension is provided to the client. It is determined, responsive to determining that the pattern corresponds to the whitelisted browser extension with respect to the first web page, that the user of the client is a trusted user of the first web page. The request is passed to the server in response to determining that the user of the client is the trusted user of the first web page.

In some implementations, the request is passed to the server based on a configurable security policy. Input is received from an authorized administrator. The security policy is configured based on the input.

According to some implementations, the request is passed to the server in response to determining that match criteria are met. The match criteria comprise: the request being associated with the whitelisted browser extension, and one or more of: an IP (Internet Protocol) address of the client corresponding to a designated IP address, a header of the request corresponding to a designated header, or the request being associated with a resource having a designated URI (Uniform Resource Identifier).

According to another class of implementations, a request from a client to a server is received at a device in communication with the server and the client. The request corresponds to an interaction with a first web page hosted by the server. A pattern associated with the request is identified. It is determined that the pattern corresponds to a particular browser extension associated with a web browser operating on the client. One or more actions are performed. The actions can include one or more of: logging the request, dropping the request, passing the request, banning an IP address associated with the client from communicating with the server, or causing a warning to be rendered by the web browser operating on the client.

In some implementations, the actions are performed based on a configurable security policy. Input is received from an authorized administrator associated with the first web page. The security policy is configured based on the input.

Also or alternatively, data is received at the device from an automated threat intelligence feed. The data represents a set of configurable rules related to verified malicious or potentially malicious browser extensions. The security policy is updated based on the data.

In some implementations the actions are performed in response to determining that match criteria are met. The match criteria comprise: the request being associated with the particular browser extension, and one or more of: the IP address of the client corresponding to a designated IP address, a header of the request corresponding to a designated header, or the request being associated with a resource having a designated URI.

According to some implementations detection code is injected into a response from the server to the client. The detection code is configured to detect the particular browser extension on the client, and to communicate data to the device. The data indicates that the browser extension is operating on the client.

In some implementations, a second request is received at the device from a second client to a second server. The further request corresponds to a second interaction with a second web page. The second web page is different from the first web page. A second pattern associated with the second request is identified. It is determined that the second pattern corresponds to the particular browser extension. The request to the second server.

According to some implementations, determining that the pattern corresponds to the particular browser extension comprises determining that the pattern represents an attribute of a group of browser extensions that includes the particular browser extension.

According to another class of implementations, a request from a client to a server is received at a device in communication with the server and the client. The request corresponds to an interaction with a first web page hosted by the server. The request is analyzed. It is determined that the request corresponds to an unknown browser extension associated with a web browser operating on the client. The request is logged. The request is processed based on a security policy.

In some implementations, processing the request comprises dropping the request, or passing the request to the server.

According to another class of implementations, requests from a plurality of clients to a server are received at a device in communication with the clients and the server. Each request corresponds to an interaction with a first web page hosted by the server. A pattern associated with a first one of the requests is identified. It is determined that that the pattern corresponds to a particular browser extension associated with a web browser operating on a first client. The first request originates at the first client. One or more actions are performed. The one or more actions include one or more of: logging the first request, dropping the first request, passing the first request, banning an IP address associated with the first client from communicating with the server, or causing a warning to be rendered by the web browser operating on the first client.

In some implementations, the actions are performed based on a configurable security policy. Input is received from an authorized administrator associated with the first web page. The security policy is configured based on the input.

Also or alternatively, data is received at the device from an automated threat intelligence feed. The data represents a set of configurable rules related to verified malicious or potentially malicious browser extensions. The security policy is updated based on the data.

In some implementations, the actions are performed in response to determining that match criteria are met. The match criteria comprise: the first request being associated with the particular browser extension, and one or more of: the IP address of the first client corresponding to a designated IP address, a header of the first request corresponding to a designated header, or the first request being associated with a resource having a designated URI.

In some implementations, detection code is injected into a response from the server to the first client. The detection code is configured to detect the particular browser extension on the first client, and to communicate data to the network appliance. The data indicates that the particular browser extension is operating on the client.

In some implementations it is determined that the pattern corresponds to the particular browser extension by determining that the pattern represents an attribute of the particular browser extension that corresponds to a group of browser extensions.

According to another class of implementations, requests from clients associated with a protected entity to a plurality of servers are received at a device in communication with the clients and the servers. Each request corresponds to an interaction with a web page hosted by one of the servers. A pattern associated with a first one of the requests is identified. It is determined that that the pattern corresponds to a particular browser extension associated with a web browser operating on a first client. The first request originates at the first client. One or more actions are performed. The one or more actions include one or more of: logging the first request, dropping the first request, passing the first request, banning an IP address associated with the first client from communicating with the server, or causing a warning to be rendered by the web browser operating on the first client.

In some implementations, the actions are performed based on a configurable security policy. Input is received from an authorized administrator associated with the entity. The security policy is configured based on the input.

Also or alternatively, data is received at the device from an automated threat intelligence feed. The data represents a set of configurable rules related to verified malicious or potentially malicious browser extensions. The security policy is updated based on the data.

In some implementations, detection code is injected into a response from a first one of the servers to the first client. The detection code is configured to detect the particular browser extension on the first client, and to communicate data to the network appliance. The data indicates that the particular browser extension is operating on the client.

A further understanding of the nature and advantages of various implementations may be realized by reference to the remaining portions of the specification and the drawings.

DETAILED DESCRIPTION

Figure 1:
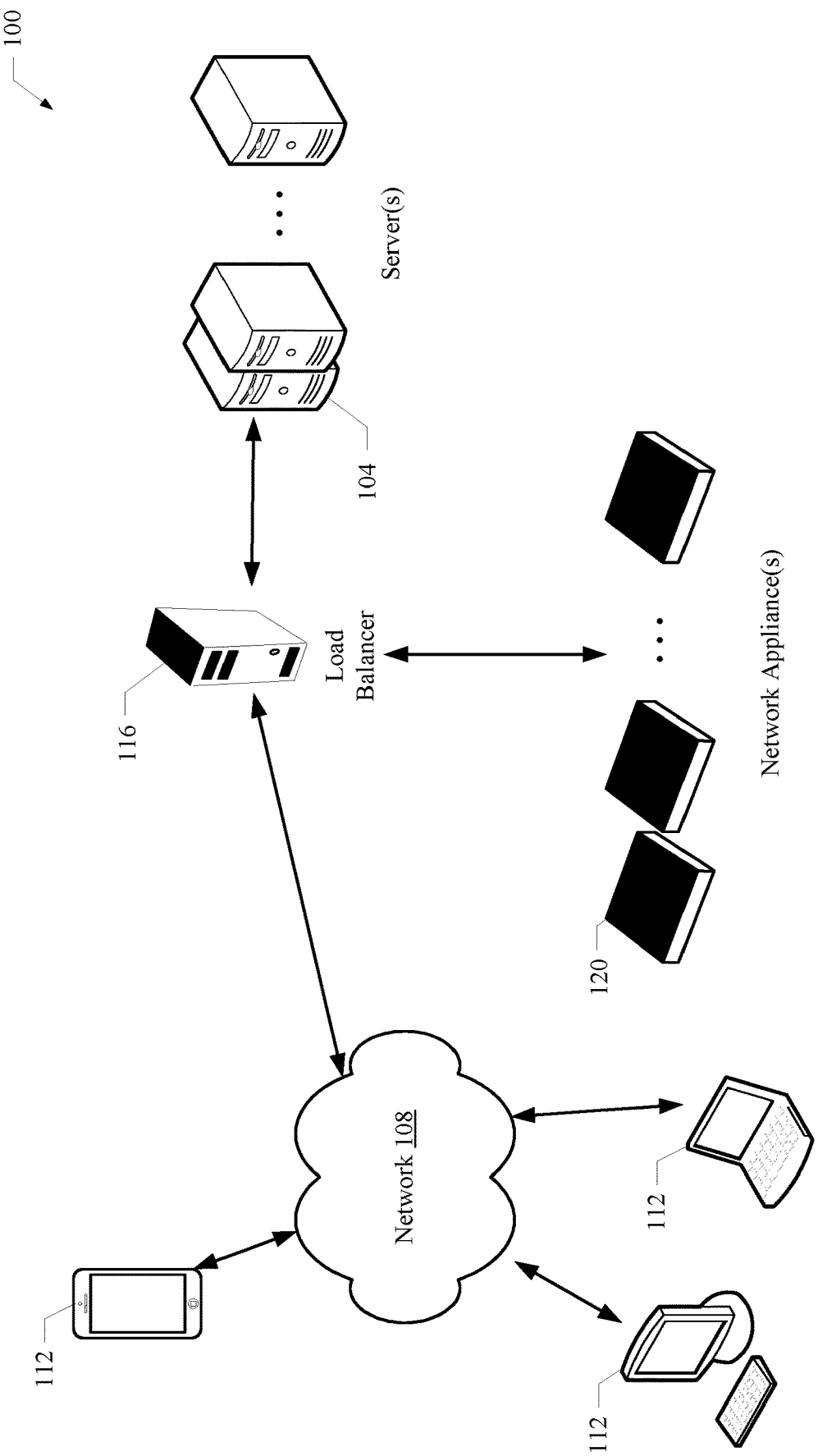
FIG. 1 is simplified diagram of a computing environment in which particular implementations enabled by the present disclosure may be practiced.

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

This disclosure describes techniques for applying security policies based on detected browser extensions. As used herein, the term browser extension generally refers to a component operating in conjunction with a web browser on a client device that augments the web browser's standard functionality. A browser extension is sometimes also referred to as an "add-on," a "plug-in," an "app," etc. Such browser extensions can be developed by a variety of sources such as browser vendors, independent providers, private individuals, etc. While many browser extensions are used to improve user experiences, some browser extensions can be abused to harm web servers and clients alike. By way of example, a malicious third party may develop a browser extension to sniff web transactions and gather identifying information such as credit card numbers or user authentication credentials. The malicious third party may induce unknowing users to install such an extension through phishing or by disguising it as a legitimate browser extension.

Browser extensions can also pose a significant threat to web sites. By way of example, a malicious third party might want to mine a social networking web site for data in order to sell the data to advertisers. The third party might create a "content-grabbing" browser extension that uses the credentials of users of the social networking web site to extract data from their friends' profiles and send the data back to the malicious third party's servers. Such data extraction may not be within the terms of service of the social networking web site. Therefore, the operator of the social networking web site may wish to block the content grabbing browser extension from accessing the web site.

According to specific implementations described herein, both malicious and benign browser extensions can be detected and appropriate automated responses can be produced. Returning to the example of the preceding paragraph, a request to grab content from the social networking web site can be intercepted and the content grabbing browser extension can be detected, as described below. A configurable security policy can define known browser extensions and actions to be performed when a request associated with such browser extensions is detected. Therefore, any requests associated with the content grabbing browser extension can be dropped before the requests reach the web servers of the social networking web site.

While some browser extensions can be exploited by malicious third parties, many browser extensions are desirable and can be used to improve user experience and enhance the functionality of web sites. Further complicating matters, a browser extension that is considered malicious with respect to one web site may actually be desired to enhance the functionality of a different web site. Returning to the example of the preceding paragraph, the content grabbing browser extension that presents a problem to the social networking web site can be neutral to a web page maintained by an online retailer. As such, while it is desirable for the social networking web site to deny the content grabbing browser extension access to its web site, the online retailer may want to allow users with the content grabbing browser extension to access their web site.

In some implementations, a browser extension that is desirable, or known to be benign to the functionality to a particular web site, can be "whitelisted," e.g., a record of the browser extension can be maintained so that requests associated with that browser extension can be passed from a client to a server hosting a web page of the web site. Such whitelisting can operate within the context of a single device (or devices) implementing the browser extension detection and response techniques disclosed herein, or be extended to other security layers or devices deployed in front of the web site. In the latter case, if a browser extension is a whitelisted browser extension for the web site, all requests associated with the whitelisted browser extension can be directly forwarded to the web server(s) of the web site, without being routed through any other security layers or devices (such as a web application firewall, intrusion prevention system, etc.) deployed in front of the web site. This can be especially useful when these other security layers or devices cannot effectively detect the whitelisted browser extension themselves. Returning to the example of the preceding paragraph, the online retailer can add the content grabbing browser extension to their whitelist of allowed browser extensions. As described below, requests associated with whitelisted browser extensions can be passed directly to the web servers of the online retailer bypassing other security layers or devices, such as a web application firewall deployed in front of the web servers, while requests from other browser extensions can be dropped. Specific implementations will now be described with reference to the accompanying figures.

FIG. 1 illustrates an example of a computing environment 100 in which browser extensions are detected. One or more server(s) 104 serve web pages via a network 108 to one or more client devices 112. Network 108 represents any subset or combination of a wide array of network environments, including the internet, public networks, private networks, local area networks, TCP/IP-based networks, telecommunications networks, wireless networks, cable networks, etc. Client devices 112 could be any device capable of requesting web pages served by server(s) 104. For instance, such devices might include a desktop computer, a laptop computer, a tablet, a smartphone, a set top box, a wearable device, etc.

A load balancer 116 acts as an intermediary between the servers 104 and the network 108, distributing requests and responses (e.g., interactions by users of client devices 112 web pages served by servers 104) to one or more network appliances 120. The one or more network appliances 120 process at least a portion of the requests received, potentially performing actions in relation to the requests as described below. Ultimately, the one or more network appliances 120 can pass the requests to servers 112 via the load balancer 116.

Figure 2:
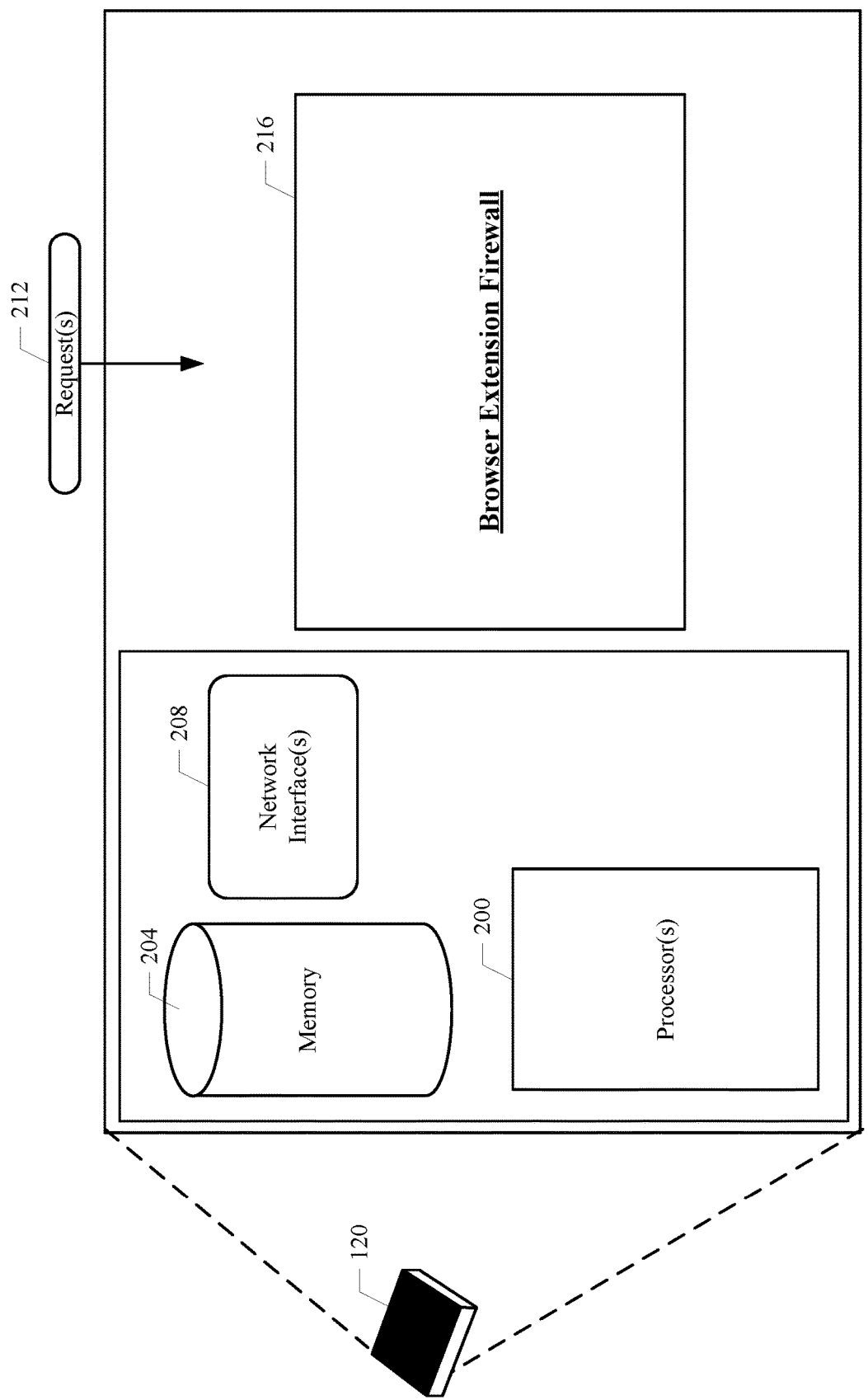
FIG. 2 is a simplified block diagram of a network appliance.

A simplified block diagram of such a network appliance 120 is shown in FIG. 2. Appliance 120 contains one or more processors 200, including one or more single or multi-core processors configured to execute stored instructions. Appliance 120 also includes one or more memories 204. Memory 204 comprises non-transitory computer-readable storage media that could potentially include a wide variety of forms of volatile and non-volatile storage media. Memory 204 provides storage for computer readable instructions, data structures, program modules and other data for the operation of appliance 120.

Appliance 120 also includes one or more network interfaces 208. The network interfaces 208 may be used to connect via wired or wireless connections to any of a variety of network types including, for example, cellular networks, wireless networks, the internet, public networks, private networks, wide area networks, local area networks, etc. In some implementations, appliance 120 might also include, network processors or network specific ASIC (Application-Specific Integrated Circuit) hardware chips.

Appliance 120 also includes one or more buses or other internal communications hardware or software (not shown) that allow for the transfer of data and instructions between the various modules and components of the appliance.

While appliance 120 might have many functions, this disclosure focuses mainly on the use of appliance 120 to detect browser extensions, to apply configurable security policies, and to take corresponding actions in response to detection. For example, appliance(s) 120 might function as web security appliances protecting servers 104. For example, appliance 120 might be a ShapeShifter® manufactured by Shape Security®, an MWS1000® appliance manufactured by Juniper Networks®, or any of a wide variety of other web security products.

In one implementation, appliance 120 receives request(s) 212 corresponding to an interaction with a web page through one or more network interfaces 208. For example, request(s) 212 may correspond to interactions by users of client devices 112 with web pages served by servers 104.

Request(s) 212 are processed by Browser Extension Firewall 216, which includes a series of modules that are described in greater detail below in the context of FIGS. 3 and 4. It will be understood that these and other modules may be implemented by processor(s) 200 executing code in memory 204.

After request(s) 212 are processed by Browser Extension Firewall 216, responses can be transmitted from the appliance 120 via the one or more network interfaces 208. As described in more detail below, such responses can vary across implementations. For example, a response may include transmission of request(s) 212 to a load balancer (e.g., load balancer 116 of FIG. 1) and then on to a server via a network (e.g., to server(s) 104 via network 108 as shown in FIG. 1). Also or alternatively, a response may include logging, dropping, or redirecting request(s) 212, as discussed in further detail below.

It should be noted that, despite references to specific computing paradigms and software tools in this disclosure, the computer program instructions on which implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, references to particular protocols in this disclosure are merely by way of example. Suitable alternatives known to those of skill in the art may be employed as appropriate for particular implementations.

Figure 3:
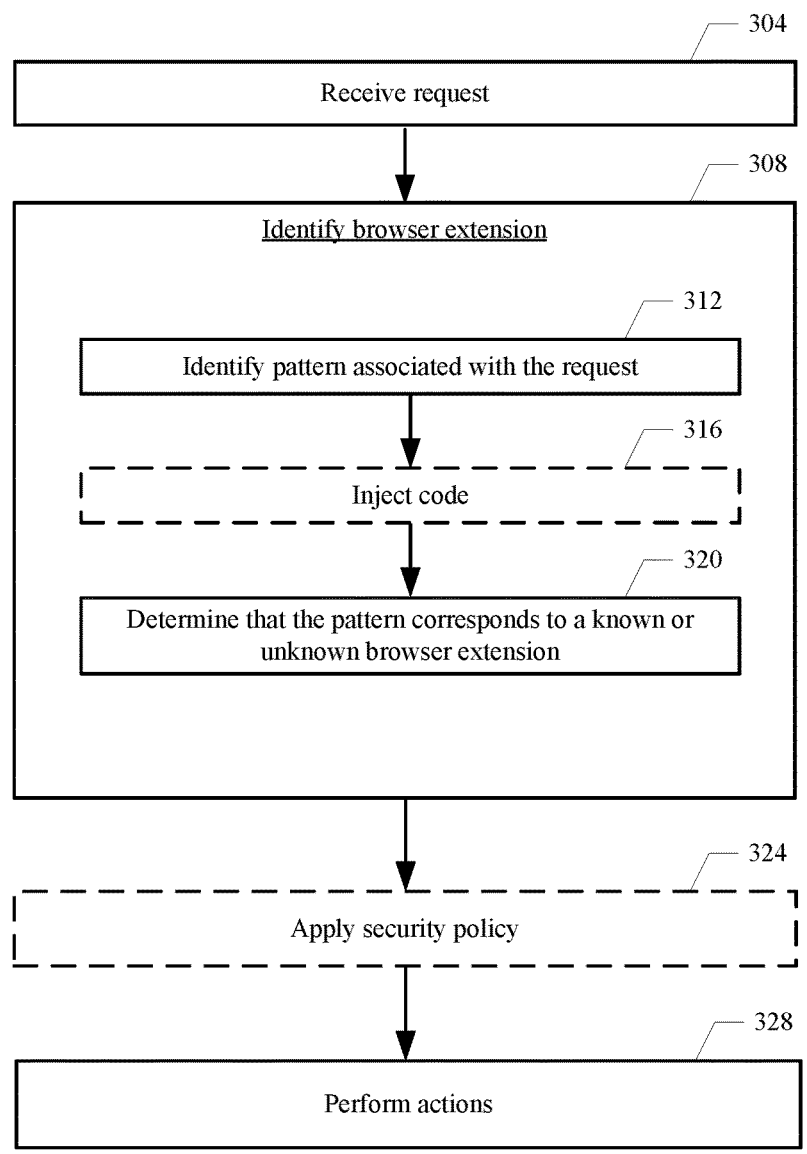
FIG. 3 is a flowchart illustrating the operation of a specific implementation in which a browser extension is detected.
Figure 4:
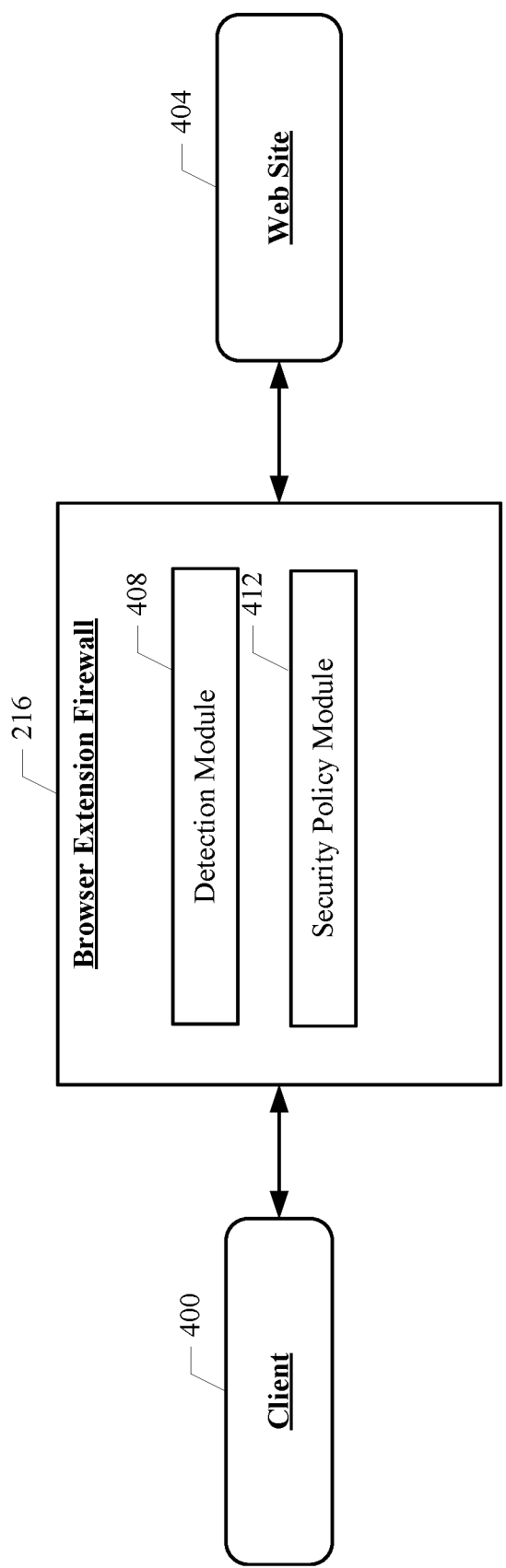
FIG. 4 is a simplified block diagram of an example of a system for detecting and responding to the detection of browser extensions.

Referring now to FIG. 3, a particular example of a technique for detecting browser extensions is described. For illustrative purposes, the example of FIG. 3 is discussed in the context of computing environment 100 of FIG. 1. However, it should be noted that the techniques described are generally applicable to a wide variety of computing environments. It should also be noted that the example of FIG. 3 could be implemented in a variety of ways including, for instance, integrated with the operation of a network appliance such as, for example, appliance 120 described in the context of computing environment 100. Alternatively, detection of browser extensions as described herein might be implemented in another device (e.g., integrated with a web server or at an intermediate device such as a load balancer) or be distributed among multiple devices.

A request from a client to a server is received (304). The request can vary across implementations and is discussed below in the context of FIG. 4, which depicts a simplified block diagram of an example of a system for detecting browser extensions. In FIG. 4, requests from client 400 accessing web site 404 are processed by the modules of Browser Extension Firewall 216 of appliance 120 to produce automated responses. For example, the request can correspond to an interaction with a web page of web site 404 of FIG. 4 hosted by a server (e.g., Server(s) 104 of FIG. 1). The request can be any type of communication from a client to a server. By way of example, the request can originate from an action of a human user of the client interacting with a web page, e.g., clicking a link, entering a URL of the web page into an address bar, entering authentication credentials, etc. Alternatively, the request can originate from an automated function of a browser operating on the client, e.g., content scraping, transaction sniffing, etc.

Requests can be transmitted across a variety of transmission media. For example, a request might take the form of signals transmitted from client devices 112 by way of a T1 or T3 line, an optical carrier line such as a line to a synchronous optical network or a fiber optic network, a telephone line, a coaxial cable, a twisted pair copper cable, etc. Requests might also be transmitted wirelessly via a WiFi local area network, a Bluetooth private network, etc.

Returning to FIG. 3 a browser extension associated with the request is identified (308). The identification of browser extensions can include a variety of steps, which can occur in a varying order. One such example is shown in 312-320 of FIG. 3 and is discussed below in the context of FIG. 4. In FIG. 4, requests from client 400 accessing web site 404 are processed by the modules of Browser Extension Firewall 216 of appliance 120 to produce automated responses, discussed below. Alternatively, the browser extension detection and response process can be implemented across a variety of devices in a number of different computing environments, some of which are described below.

In some implementations, browser extensions are not detected directly, but rather the effect or signature of a browser extension is detected in a request from a client, e.g., some browser extensions can be identified by common attributes in an HTTP (Hyper Text Transfer Protocol) request header and body.

Returning to FIG. 3, a pattern associated with the request is identified (312). By way of example, requests from client 400 of FIG. 4 and responses from servers of web site 404 can be intercepted and analyzed at detection module 408 of Browser Extension Firewall 216.

Patterns associated with browser extensions can be identified in a variety of manners. For example, a pattern associated with a given browser extension can be identified and learned by comparing traffic from clients that are operating with and without the extension. A pattern that is present in a request when the extension is operating on a client device but is not present when the extension is not operating on a client device can be verified to be associated with the browser extension. By way of illustration, when a user logs into a social networking web site without a particular browser extension, the request might contain only the user's username and password. On the other hand, when a user logs into the social networking web page with that browser extension the request might contain additional information. Therefore, if a request is received that contains the additional information, it can be determined that the browser extension is operating on the client device at which the first request originated.

One having skill in the art can appreciate that a large and diverse set of browser extensions is currently available with many new and updated browser extensions becoming available every day. Therefore, an entity such as a cyber-security provider can use the techniques described herein to maintain an up to date list of browser extensions and corresponding patterns that are presented in requests from clients operating such browser extensions.

Returning to FIG. 3, in some implementations, code is injected in a response that is provided to the client device (316). By way of example, such code can be injected in a response to client 400 of FIG. 4 from a server hosting web site 404. Code can be injected at and sent from Browser Extension Firewall 216. Such injected code can be executed on client 400 to gather information relating to browser extensions operating on client 400 and send the information to detection module 408 of Browser Extension Firewall 216. Such information can be used to improve reliability of detection of browser extensions at 312 of FIG. 3 and can be used in conjunction with or separately from the identification of patterns discussed above in the context of 312 of FIG. 3.

The injected code can be configured to cause browser extension information to be sent from a client at a variety of times. For example, browser extension information can be sent from client 400 of FIG. 4 to Detection Module 408 any time client 400 makes a request. Also or alternatively, the injected code can be configured to cause browser extension information to be sent any time a new browser extension begins operating on client 400. In some implementations, browser extension information can be sent from client 400 to Detection Module 408 continuously or at periodic time-intervals, e.g., once an hour, once a day, once a week, etc.

Various techniques can be used to ensure that such injected code is not detected by malicious third parties having access to the client device. By way of example, injected code can be obfuscated such that it is difficult for malicious third parties to detect. According to various implementations, the ways in which injected code is obfuscated may vary considerably. For example, obfuscation of injected code may be accomplished in accordance with techniques described in the following U.S. patent applications, each of which is incorporated herein by reference and forms part of this disclosure: U.S. patent application Ser. No. 14/055,646 for Protecting Against the Introduction of Alien Content filed on Oct. 16, 2013; U.S. patent application Ser. No. 14/055,704 for Safe Intelligent Content Modification filed on Oct. 16, 2013; U.S. patent application Ser. No. 14/286,733 for Polymorphic Treatment of Data Entered at Clients filed on May 23, 2014.

It will be understood that obfuscation techniques evolve over time and an obfuscation module can be configured to execute the above-described obfuscation techniques and other existing obfuscation techniques, as well as yet-to-be conceived obfuscation techniques. Suitable variations will be apparent to those of skill in the art.

Returning to FIG. 3, in some implementations, it is determined that the request is associated with a known or unknown browser extension (320). By way of example, if, at 312 of FIG. 3, a pattern associated with a request is identified, and the pattern corresponds to a particular known browser extension, then it can be determined that the request is associated or generated in conjunction with that browser extension. Similarly, if browser extension information sent by code injected at 316 of FIG. 3 indicates that the browser extension is operating on a client, it can be verified that the request is associated or generated in conjunction with that browser extension.

Alternatively, some requests may be determined to be associated with an unknown browser extension. By way of illustration, if a request presents a pattern that cannot be identified at 312, and injected code cannot expose a recognizable browser extension at 316, it can be determined that the request is associated with an unknown browser extension.

In some implementations, when an unknown browser extension is detected the unknown browser extension can be tracked such that it can be identified in the future. By way of illustration, any requests associated with unknown browser extensions can be logged and such logs can be provided to a network administrator for a web site. A log of a request can include an indication of any patterns associated with the request as well as an indication the request is associated with an unknown browser extension. The network administrator can study the log and investigate the matter to identify the unknown browser extension, determine whether the unknown browser extension should be allowed to access the web site, and potentially update the security policy accordingly as described below.

According to some implementations, a security policy is applied in response to the detection of a known or unknown browser extension (324). By way of example, Security Policy Module 412 of FIG. 4 can be used to apply the security policy. The security policy can be a collection of ordered rules governing automated responses to requests that occur based on the detection of browser extensions associated with such requests as described above. Each rule can include 2 parts, a match criterion (or criteria) and an action. Whenever the match criterion (or criteria) is met, the corresponding action can be performed.

Match criteria can vary across implementations. By way of example, in a rule relating to one browser extension, the match criterion (or criteria) of the rule can be met by a request when it is determined that the request is associated with that browser extension at 320 of FIG. 3. In some implementations, match criteria may also include a variety of additional client and/or server metrics such as a client IP (Internet Protocol) address, a client request header, a server URI (Uniform Resource Identifier), etc., as described further below.

Actions that are performed in response to match criteria being met can vary across implementations. For example, a request can be passed, a request can be dropped, a request can be logged with detailed information indicating what caused the match, a client at which a request originates can be redirected to a web page with warnings about a detected malicious browser extension, a client IP address at which a request originates can be banned for a configurable period of time, etc.

One example of a configurable a security policy with 5 rules is shown in Table 1.

TABLE 1

| # | Rule Name | Match | Action |
|---|---|---|---|
| 1 | whitelist-good-browser-extension-A | Source IP: 30.30.0.0/16<br>Host: any<br>URI: .*<br>Browser extension: "good-browser-extension-A" | Pass |
| 2 | whitelist-good-browser-extension-B | Source IP: any<br>Host: any<br>URI: .*<br>Browser extension: "good-browser-extension-B" | Pass |
| 3 | adblock-notify | Source IP: subnet 20.20.20.0/24<br>Host: www.ad-server-example.com<br>URI: .*<br>Browser extension: "AdBlock" | Redirect with warning on adblock |
| 4 | content-scraping-deny | Source IP: any<br>Host: www.content-server-example.com<br>URI: .*profile.*<br>Browser extension: "content-scraper" | Drop |
| 5 | unidentified-log | Source IP: any<br>Host: any<br>URI: any<br>Browser extension: "unidentified" | Log |

Table 1 shows match criteria and actions corresponding to each of the 5 rules. By way of example, rule #4 is named "content-scraping-deny." The first match criterion of rule 5 is met when the "content-scraper" browser extension is identified in a request. According to the match criteria of rule #4, the request can originate from any client IP address and must be directed to the host "www.content-server-example.com." The remaining match criterion of rule #4 is met when the request involves accessing a resource with a URI containing the text "profile." When the match criteria of rule #4 are met by a request, the request will be dropped, as indicated in the "Action" column. Therefore, returning to the example or the social networking web site described above, rule #4 can be included in a configurable security policy by an administrator of the social networking web site to block requests associated with the known content scraper browser extension that grabs profile information from the social networking web site.

Along the same lines, rules #1 and #2 represent the whitelisting of particular known benign browser extensions. Rule #3 represents redirecting a client at which a request associated with the "AdBlock" browser extension originates to a web page with warnings about the AdBlock extension. Lastly, rule #5 represents the logging of a request associated with an unknown browser extension.

The security policy described herein can be highly configurable, providing administrators and web site operators the flexibility to account for the fact that the same browser extension may present a threat to one web site but be completely legitimate with respect to another web site. For example, an authorized administrator of a web site can send input via his computing device to appliance 120 of FIG. 2. Security policy module 412 of FIG. 4 can process the input to configure the security policy, e.g. by generating, modifying, or deleting a rule. The ability to specify a fine-grained security policy can offer the flexibility to web site administrators to specify rules based on their business needs. By way of illustration, an operator of one web site can specify a rule that all requests associated with a particular browser extension will be dropped because he has determined that the browser extension is malicious with respect to that web site. On the other hand, an operator of another web site can specify a rule that all requests associated with the same browser extension will be passed because he has determined that the browser extension improves the user experience of his web site.

In some implementations, a security policy can be used to whitelist known benign or desirable browser extensions. By way of illustration an operator of a web page can generate a whitelist of 10 browser extensions that beneficially extend functionality of the web page. The operator can specify the security policy such that only requests from the whitelisted browser extensions can be passed directly to web servers of the web page and requests from any other browser extension can be subjected to standard security inspections, e.g., by a web application firewall, an intrusion prevention system, etc.

In some implementations, a whitelist of browser extensions can be dynamic to account for evolving threats to web sites. By way of example, a particular browser extension may be developed for a number of positive uses and, therefore, be added to a whitelist of browser extensions for a website. As the web site evolves, the web site may become vulnerable to newly discovered malicious uses of the particular browser extension. Therefore, the particular browser extension can be removed from the whitelist of browser extensions for the web site.

Also or alternatively, a whitelist of browser extensions can be used for authentication. By way of illustration, operators of a web site may implement an additional set of security mechanisms such as a web application firewall. Unfortunately, some of the web site's trusted users may be erroneously categorized as "bad users" by the web application firewall. Trusted users, and only trusted users, can be provided with an "authentication" browser extension. The authentication browser extension can be whitelisted such that requests associated with the authentication browser extension will be passed. On the other hand, requests from other users who do not have the whitelisted browser extension will go through standard security inspections, e.g., by a web application firewall. Therefore, the whitelisted authentication browser extension allows all trusted users to access the web site regardless of their classification by the web application firewall and enables crucial functionality support for the trusted users that would otherwise be impacted by the web application firewall.

In some implementations, browser extensions can be grouped and a security policy can be applied to groups of browser extensions. For example, as the number of browser extensions regulated by a security policy increases, it may be desirable to place functionally similar browser extensions in groups, and enforce security policy based on these groups. By way of example, the browser extensions regulated by a given security policy might fall into three categories: toolbar, content-scraping, and content-blocking. Browser extension groups for each of the three categories can be defined as shown below:

```
<browser-extension-group>
    <name>toolbar-group</name>
    <member>toolbar-extension-1</member>
    <member>toolbar-extension-2</member>
    <member>toolbar-extension-3</member>
</browser-extension-group>
<browser-extension-group>
    <name>content-scraping-group</name>
    <member>content-scraping-extension-1</member>
    <member>content-scraping-extension-2</member>
    <member>content-scraping-extension-3</member>
    <member>content-scraping-extension-4</member>
</browser-extension-group>
<browser-extension-group>
    <name>content-blocking-group</name>
    <member>content-blocking-extension-1</member>
    <member>content-blocking-extension-2</member>
</browser-extension-group>
```

With above definitions, an administrator can define rules in a security policy having match criteria that are met when a request associated with a browser extension in the "toolbar-group," "content-scraping-group," and "content-blocking-group" is identified. In some implementations, groups can be defined dynamically in a security policy, e.g., if a browser extension is added to a first group, the security policy can be automatically updated accordingly.

Groups of browser extensions can be defined to have more than one hierarchical level. By way of illustration, a first group of browser extensions might include browser extensions that extract data from web sites in a particular manner. The first group of browser extensions might be part of a larger group of "general data extraction" browser extensions that includes the entire class of browser extensions that extract data from web sites. The group of "general data extraction" browser extensions may be part of a group of "general web site attacking" browser extensions that includes the entire class of browser extensions that can be used to attack web sites.

In some implementations, an "automated threat intelligence feed" can be used to keep a security policy up to date. By way of illustration, a vendor, such as a cyber security provider, can research and identify malicious, good, and benign browser extensions. The vendor can perform out-of-band research on published browser extensions from various browser providers' stores, e.g., the Google Chrome® web store. Such research can be used to produce a list of malicious and potentially malicious browser extensions. The vendor can use the list to generate an automated threat intelligence feed that includes configurable rules related to the malicious and potentially malicious browser extensions that the vendor researched and identified. The automated threat intelligence feed can be hosted on a server and provided to or retrieved by security policy module 412 of FIG. 4 for the purpose of updating the policies of module 412. The automated threat intelligence feed can be updated periodically by the vendor and periodically retrieved by or provided to security policy module 412. Also or alternatively, an automated threat intelligence feed can be configured and customized by operators of web sites based on their individual threat assessments and business needs. A manually configurable security policy and an automatically retrieved threat intelligence feed can be implemented in conjunction with each other or separately.

In some implementations, a security policy can include a global security model definable by an administrator that defines a response that occurs when a client request does not match any rules in the security policy, e.g., a request that is associated with an unknown browser extension. For example, in a positive security model all client requests that do not meet the match criteria of any rules specified by the security policy will be dropped. A positive security model may be applied in environments with strict security requirements because all unknown or unidentified browser extensions are considered potentially unsafe. Alternatively, in a negative security model all client requests that do not meet the match criteria of any rules specified by the security policy will be passed. A negative security model may sometimes be applied in environments where user experience is valued over security because only known malicious browser extensions are considered potentially unsafe.

Returning to FIG. 3, one or more actions are performed in relation to the request (328). For example, such actions can include the actions specified by the security policy described in the context of 324 of FIG. 3 above, e.g., the request can be passed, the request can be dropped, the request can be logged with detailed information describing what caused the match, a client at which a request originates can be redirected to a web page with warnings about a detected malicious browser extension, a client IP address at which a request originates can be banned for a configurable period of time, etc.

Figure 5:
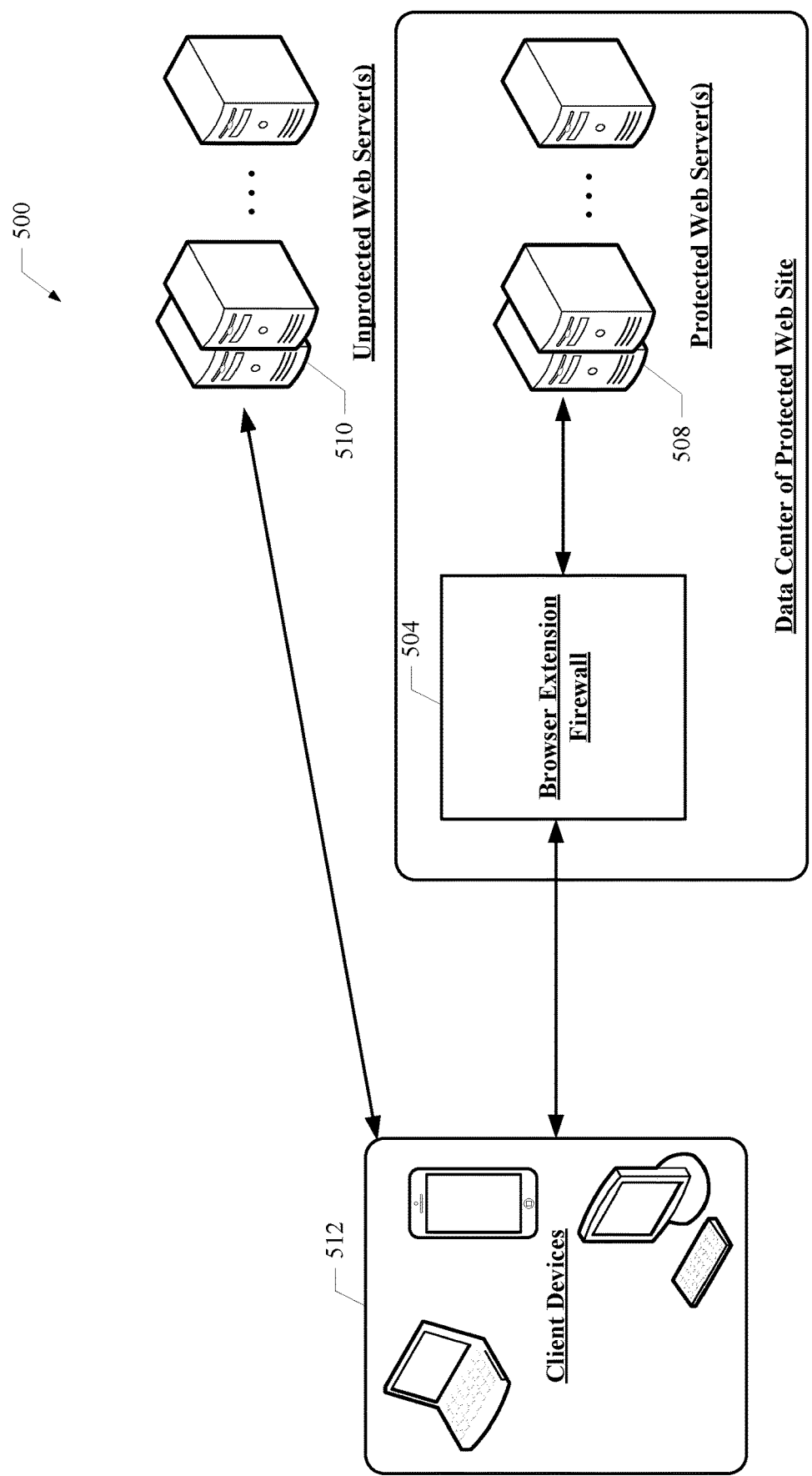
FIG. 5 is a simplified diagram of a computing environment in which particular implementations enabled by the present disclosure may be practiced.

One having skill in the art would appreciate that the disclosed techniques can be applied in a diverse array of computing environments in a variety of contexts. For instance, FIG. 5 shows an example of a computing environment 500 where Browser Extension Firewall 504 acts as a reverse proxy mediating communication between web servers 508 and client devices 512. In computing environment 500, Browser Extension Firewall 504 is deployed in front of web servers 508 to protect web sites hosted by web servers 508. All requests originating from client devices 512 accessing web pages of web sites hosted by of web servers 508 can pass through Browser Extension Firewall 504. Therefore, in computing environment 500, Browser Extension Firewall 504 can serve to protect web servers 508 from malicious browser extensions operating on any client devices 512 that access web pages of web sites hosted by web servers 508. On the other hand, requests originating from client devices 512 accessing web pages of web sites hosted by unprotected web servers 510 do not pass through Browser Extension Firewall 504.

Browser Extension Firewall 504 can reside in a variety of places such as on network appliance 120 of FIG. 1 or on one or more physical and/or virtual servers. As will be understood, the depicted devices represent a much greater diversity of device types that might be included in computing environment 500. And like network 108 of FIG. 1, computing environment 500 can represent any subset or combination of a wide array of network environments, including the internet, public networks, private networks, local area networks, TCP/IP-based networks, telecommunications networks, wireless networks, cable networks, etc.

Figure 6:
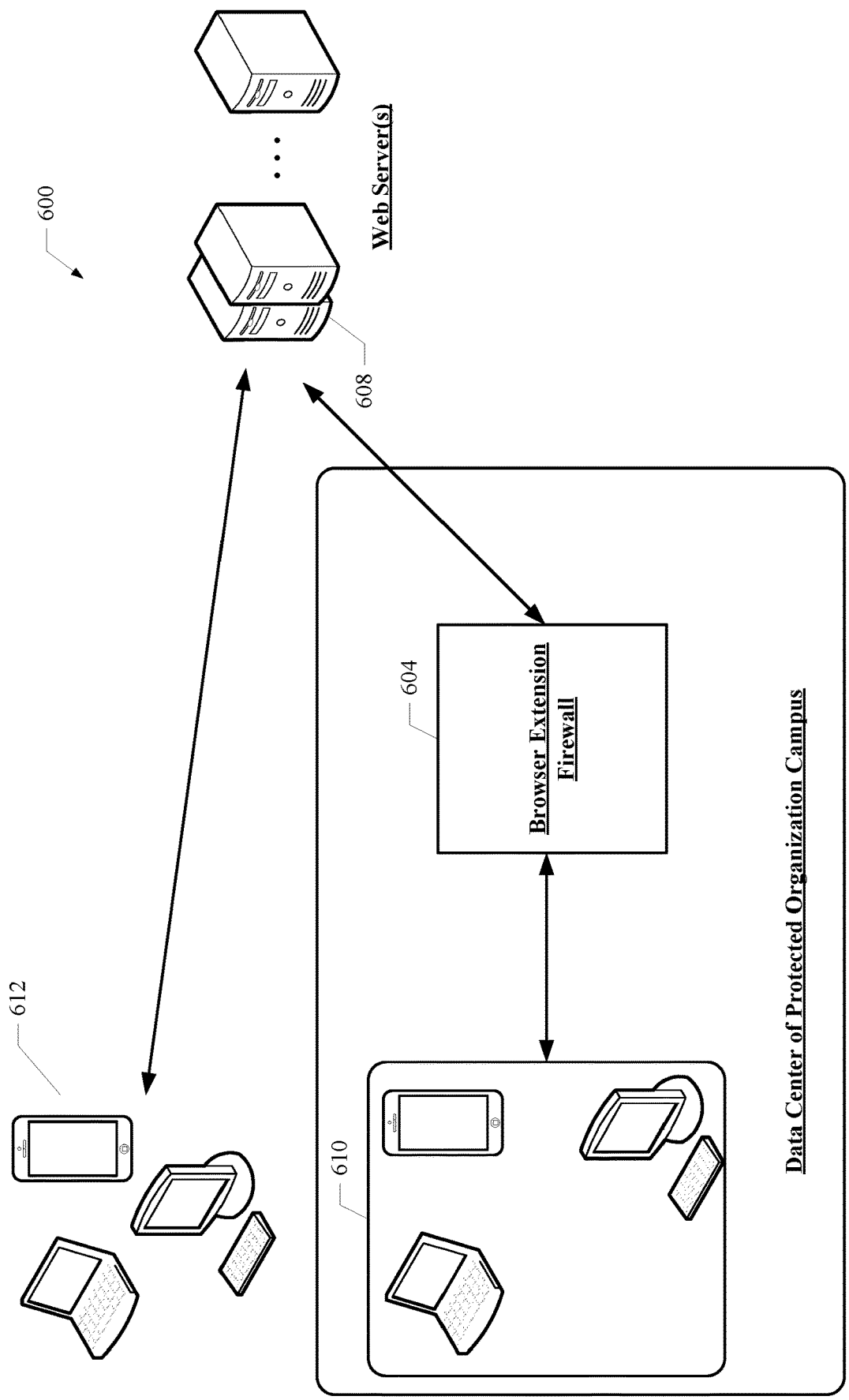
FIG. 6 is another simplified diagram of a computing environment in which particular implementations enabled by the present disclosure may be practiced.

Alternatively, FIG. 6 shows an example of a computing environment 600 where Browser Extension Firewall 604 acts as a forward proxy mediating communication between web servers 608 and protected client devices 610. Similar to Extension Firewall 504 of FIG. 5, Browser Extension Firewall 604 can reside in a variety of places and operate in a variety of manners. In computing environment 600, Browser Extension Firewall 604 is deployed at an outbound gateway of protected client devices 610, which belong to a protected entity such as an enterprise or an organization. Browser Extension Firewall 604 protects client devices 610 from malicious browser extensions that can cause potential damage on the client-side, as described above. Requests from client devices 610 to all web sites (e.g., those hosted by web servers 608) go through Browser Extension Firewall 604 while requests from unprotected client devices 612 go directly to web servers 608.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A server computer system comprising:
one or more hardware processors;
a memory coupled to the one or more hardware processors and storing one or more instructions which, when executed by the one or more hardware processors, cause the one or more hardware processors to:
determine, based on identifying a first pattern in a first request from a first client to a first web server system that has a known association with a first browser extension, that the first browser extension is associated with the first request;
determine when the first browser extension associated with the first request is whitelisted with respect to the first web server system based on a security policy; and
in response to the determination that the first browser extension is whitelisted with respect to the first web server system, perform a first automated response that causes the first web server system to process the first request.

2. The computer system of claim 1:
wherein the security policy is a configurable security policy for the first web server system;
wherein the one or more instructions, when executed by the one or more hardware processors, cause the one or more hardware processors to:
receive input from an authorized administrator of the first web server system; and
configure the configurable security policy based on the input.

3. The computer system of claim 1, wherein the one or more instructions, when executed by the one or more hardware processors, cause the one or more hardware processors to:
receive data from an automated threat intelligence feed, the data representing a set of configurable rules related to verified malicious or potentially malicious browser extensions; and
update the security policy based on the data.

4. The computer system of claim 1, wherein the first pattern is determined by analyzing traffic from clients operating with the first browser extension and other clients operating without the first browser extension.

5. The computer system of claim 1, wherein the one or more instructions, when executed by the one or more hardware processors, cause the one or more hardware processors to:
determine, based on identifying a second pattern in a second request from a second client to a second web server system that has a known association with a second browswe extension, that the second browser extension is associated with the second request;
determine that the second browser extension is not whitelisted with respect to the second web server system;
in response to the determination that the second browser extension is not whitelisted with respect to the second web server system, perform a second automated response that causes the second web server system to not process the second request.

6. The computer system of claim 5, wherein the second automated response comprises dropping the second request or banning an IP address associated with the second client from communicating with the second web server system.

7. The computer system of claim 1:
wherein the security policy comprises one or more groupings of browser extensions;
wherein determining that the first browser extension associated with the first request is whitelisted with respect to the first web server system comprises determining that the first browser extension belongs to a particular grouping, of the one or more groupings of browser extensions, that is whitelisted with respect to the first web server system.

8. A network security method implemented by a network security system comprising one or more intermediary devices or server devices, the method comprising:
determining, based on identifying a first pattern in a first request from a first client to a first web server system that has a known association with a first browser extension, that the first browser extension is associated with the first request;
determining the first browser extension associated with the first request is whitelisted with respect to the first web server system based on a security policy; and
in response to the determination that the first browser extension is whitelisted with respect to the first web server system, performing a first automated response that causes the first web server system to process the first request.

9. The method of claim 8, wherein the security policy is a configurable security policy for the first web server system, the method further comprising:
receiving input from an authorized administrator of the first web server system; and
configuring the configurable security policy based on the input.

10. The method of claim 8, further comprising:
receiving data from an automated threat intelligence feed, the data representing a set of configurable rules related to verified malicious or potentially malicious browser extensions; and
updating the security policy based on the data.

11. The method of claim 8, wherein the first pattern is determined by analyzing traffic from clients operating with the first browser extension and other clients operating without the first browser extension.

12. The method of claim 8, further comprising:
determining, based on identifying a second pattern in a second request from a second client to a second web server system that has a known association with a second browser extension, that the second browser extension is associated with the second request;
determining that the second browser extension is not whitelisted with respect to the second web server system;
in response to the determination that the second browser extension is not whitelisted with respect to the second web server system, performing a second automated response that causes the second web server system to not process the second request.

13. The method of claim 12, wherein the second automated response comprises dropping the second request or banning an IP address associated with the second client from communicating with the second web server system.

14. The method of claim 8:
wherein the security policy comprises one or more groupings of browser extensions;
wherein determining that the first browser extension associated with the first request is whitelisted with respect to the first web server system comprises determining that the first browser extension belongs to a particular grouping, of the one or more groupings of browser extensions, that is whitelisted with respect to the first web server system.

15. A non-transitory computer readable medium having stored thereon instructions for network security comprising executable code that, when executed by one or more processors of one or more server devices, causes the processors to:
determine, based on identifying a first pattern with a first browser extension in a first request from a first client to a first web server system that has a known association with a first browser extension, that the first browser extension is associated with the first request;
determine when the first browser extension associated with the first request is whitelisted with respect to the first web server system based on a security policy; and
in response to the determination that the first browser extension is whitelisted with respect to the first web server system, perform a first automated response that causes the first web server system to process the first request.

16. The non-transitory computer readable medium of claim 15:
wherein the security policy is a configurable security policy for the first web server system;
wherein the one or more instructions, when executed by the one or more hardware processors, cause the one or more hardware processors to:
receive input from an authorized administrator of the first web server system; and configure the configurable security policy based on the input.

17. The non-transitory computer readable medium of claim 15, wherein the executable code, when executed by the processors, further causes the processors to:
receive data from an automated threat intelligence feed, the data representing a set of configurable rules related to verified malicious or potentially malicious browser extensions; and
update the security policy based on the data.

18. The non-transitory computer readable medium of claim 1, wherein the first pattern is determined by analyzing traffic from the clients operating with the first browser extension and other clients operating without the first browser extension.

19. The non-transitory computer readable medium of claim 15, wherein the executable code, when executed by the processors, further causes the processors to:
determine, based on identifying a second pattern in a second request from a second client to a second web server system that has a known association with a second browser extension, that the second browser extension is associated with the second request;

determine that the second browser extension is not whitelisted with respect to the second web server system;

in response to the determination that the second browser extension is not whitelisted with respect to the second web server system, perform a second automated response that causes the second web server system to not process the second request.

20. The non-transitory computer readable medium of claim 19, wherein the second automated response comprises dropping the second request or banning an IP address associated with the second client from communicating with the second web server system.

21. The non-transitory computer readable medium of claim 15:

wherein the security policy comprises one or more groupings of browser extensions;

wherein for the determine that the first browser extension associated with the first request is whitelisted with respect to the first web server system, the executable code, when executed by the processors, further causes the processors to:

determine that the first browser extension belongs to a particular grouping, of the one or more groupings of browser extensions, that is whitelisted with respect to the first web server system.

22. A network security system, comprising one or more intermediary devices or server devices with memory comprising programmed instructions stored thereon and one or more processors configured to be capable of executing the stored programmed instructions to:

determine, based on identifying a first pattern in a first request from a first client to a first web server system that has a known association with a first browser extension, that the first browser extension is associated with the first request;

determine when the first browser extension associated with the first request is whitelisted with respect to the first web server system based on a security policy; and in response to the determination that the first browser extension is whitelisted with respect to the first web server system, perform a first automated response that causes the first web server system to process the first request.

23. The system of claim 22:

wherein the security policy is a configurable security policy for the first web server system;

wherein the processors are further configured to be capable of executing the stored programmed instructions to:

receive input from an authorized administrator of the first web server system; and configure the configurable security policy based on the input.

24. The system of claim 22, wherein the processors are further configured to be capable of executing the stored programmed instructions to:

receive data from an automated threat intelligence feed, the data representing a set of configurable rules related to verified malicious or potentially malicious browser extensions; and update the security policy based on the data.

25. The system of claim 22, wherein the first pattern is determined by analyzing traffic from clients operating with the first browser extension and other clients operating without the first browser extension.

26. The system of claim 22, wherein the processors are further configured to be capable of executing the stored programmed instructions to:

determine, based on identifying a second pattern in a second request from a second client to a second web server system that has a known association with a second browser extension, that the second browser extension is associated with the second request;

determine that the second browser extension is not whitelisted with respect to the second web server system;

in response to the determination that the second browser extension is not whitelisted with respect to the second web server system, perform a second automated response that causes the second web server system to not process the second request.

27. The system of claim 26, wherein the second automated response comprises dropping the second request or banning an IP address associated with the second client from communicating with the second web server system.

28. The system of claim 22:

wherein the security policy comprises one or more groupings of browser extensions;

wherein for the determining that the first browser extension associated with the first request is whitelisted with respect to the first web server system, the processors are further configured to be capable of executing the stored programmed instructions to:

determine that the first browser extension belongs to a particular grouping, of the one or more groupings of browser extensions, that is whitelisted with respect to the first web server system.

* * * * *